(12) United States Patent
Goetting et al.

(10) Patent No.: US 10,148,208 B2
(45) Date of Patent: Dec. 4, 2018

(54) CONTROL DEVICE FOR AN ELECTRIC MACHINE, A VEHICLE, AND A METHOD

(71) Applicant: Robert Bosch GmbH, Stuttgart (DE)

(72) Inventors: Gunther Goetting, Stuttgart (DE); Lanouar Chouk, Guendelbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/516,847

(22) PCT Filed: Aug. 13, 2015

(86) PCT No.: PCT/EP2015/068626
§ 371 (c)(1),
(2) Date: Apr. 4, 2017

(87) PCT Pub. No.: WO2016/055197
PCT Pub. Date: Apr. 14, 2016

(65) Prior Publication Data
US 2017/0302205 A1    Oct. 19, 2017

(30) Foreign Application Priority Data

Oct. 7, 2014   (DE) .................. 10 2014 220 208

(51) Int. Cl.
*H02P 21/14*    (2016.01)
*H02P 29/66*    (2016.01)
*H02P 29/68*    (2016.01)

(52) U.S. Cl.
CPC .............. *H02P 21/14* (2013.01); *H02P 29/66* (2016.02); *H02P 29/68* (2016.02)

(58) Field of Classification Search
CPC .................. H02P 21/14; H02P 29/66
(Continued)

(56) References Cited

U.S. PATENT DOCUMENTS 6,529,135 B1 * 3/2003 Bowers ............... H02P 23/0077
                                                318/806
6,751,960 B2 * 6/2004 Arimitsu ............... B60K 6/445
                                                60/706
(Continued)

FOREIGN PATENT DOCUMENTS

DE    102010062338    6/2012
DE    102013217424    5/2014
(Continued)

OTHER PUBLICATIONS

International Search Report for Application No. PCT/EP2015/068626 dated Oct. 26, 2015 (English Translation, 3 pages).
(Continued)

*Primary Examiner* — Eduardo Colon Santana
*Assistant Examiner* — Devon Joseph
(74) *Attorney, Agent, or Firm* — Michael Best & Friedrich LLP

(57) ABSTRACT

The invention relates to a control device for an electric machine with a stator and a rotor, comprising a temperature detection device which is designed to detect the temperature of the stator and the temperature of the rotor, as well as a calculation device which is designed to adjust the operating point of said electric machine on the basis of a specified torque, the detected temperature of the stator, the detected temperature of the rotor, and a predefined thermal load distribution of said stator and rotor. The invention also relates to a vehicle and to a corresponding method for controlling an electric machine.

10 Claims, 2 Drawing Sheets

(58) Field of Classification Search
USPC .......................................................... 318/400
See application file for complete search history.

(56) References Cited

U.S. PATENT DOCUMENTS

| | | | | |
|---|---|---|---|---|
| 7,135,830 | B2* | 11/2006 | El-Ibiary | ................. H02P 23/14 318/561 |
| 7,893,637 | B2* | 2/2011 | Suhama | .................... B60L 7/16 318/376 |
| 7,959,534 | B2* | 6/2011 | Kasuga | ................. B60K 6/365 477/3 |
| 8,531,141 | B2* | 9/2013 | Wu | ......................... H02P 21/16 318/400.02 |
| 9,649,953 | B2* | 5/2017 | Schleser | ................. B60L 15/20 |
| 2005/0071095 | A1* | 3/2005 | El-Ibiary | ................. H02P 23/14 702/60 |
| 2006/0250154 | A1 | 11/2006 | Gao et al. | |
| 2013/0207589 | A1* | 8/2013 | Margner | ................. B60L 11/02 318/717 |
| 2014/0070735 | A1 | 3/2014 | Luedtke | |
| 2015/0029620 | A1* | 1/2015 | Negre | .................... B60L 11/08 361/24 |

FOREIGN PATENT DOCUMENTS

| | | |
|---|---|---|
| DE | 102013217444 | 5/2014 |
| JP | 2014131392 | 7/2014 |

OTHER PUBLICATIONS

Windisch, T. et al., "Loss minimization of an IPMSM drive using pre-calculated optimized current references," IECON 2011—37th Annual Conference on IEEE Industrial Electronics Society, IEEE, Nov. 7, 2011, pp. 4704-4709.

* cited by examiner

CONTROL DEVICE FOR AN ELECTRIC MACHINE, A VEHICLE, AND A METHOD

BACKGROUND OF THE INVENTION

The present invention relates to a control device for an electric machine. Furthermore, the present invention relates to a vehicle including a control device according to the present invention and a method for controlling an electric machine.

Electric machines are increasingly being integrated into the drive train of road vehicles. The electric machine may be used either in addition to an internal combustion engine, as in hybrid vehicles, or as a sole drive, as in electric vehicles. This implementation places high demands on the available continuous power and peak power, as well as on the efficiency, of the electric drive.

The electric drive is generally operated in torque control mode, i.e., the vehicle controller specifies a setpoint value for the torque which is to be supplied by the electric machine. This mode may be motor operation, i.e., driving, as well as generator operation, i.e., braking.

In such a conventional control system, the required setpoint torque is converted into an associated setpoint value pair for the components of the stator current in a field-oriented coordinate system, as a function of the operating point. These current setpoint values are then controlled via a current control, which calculates the required stator voltages.

For the coordinate transformation of the measured phase currents on the one hand and the supplied controller voltages on the other hand, the angle of the rotor field is also needed, which is generally obtained, for example, in the case of the permanent magnet synchronous machine (PMSM), via a measurement of the rotor angle.

The calculation of the setpoint current components generally takes place according to the following criteria:
  minimizing the overall losses of the electric drive
  minimizing the inverter losses
  minimizing the machine losses.

Since the level of the stator current is a dominant influencing factor both in the case of the inverter losses and the machine losses (for example, quadratic dependence in the case of ohmic losses), the setpoint current components are selected in such a way that a required torque is set having a minimal current magnitude. Thus, in the so-called base speed region, operating points approach the MTPC (maximum torque per current) characteristic curve, and in the field weakening region, the maximum available stator voltage is utilized in order to minimize the required field weakening current.

DE 10 2013 217 444 A1 shows an exemplary method for controlling an electric motor.

SUMMARY OF THE INVENTION

The present invention describes a control device, a vehicle, and a method.

Accordingly, the following is provided:
  a control device for an electric machine including a stator and a rotor, including a temperature detection device which is designed to detect the temperature of the stator and the temperature of the rotor, and including a computing device which is designed to set the operating point of the electric machine based on a torque specification and the detected temperature of the stator and the detected temperature of the rotor and a predefined distribution for the thermal load of the stator and the rotor.

Furthermore, the following is provided:
  a vehicle including an electric machine which has a stator and a rotor, and including a control device according to the present invention which is coupled to the electric machine and is designed to control the electric machine.

Finally, the following is provided:
  a method for controlling an electric machine including a stator and a rotor, including detecting a temperature of the stator and a temperature of the rotor, and setting an operating point of the electric machine based on a torque specification and the detected temperature of the stator and the detected temperature of the rotor and a predefined distribution for the thermal load of the stator and the rotor.

The present invention is based on the finding that operation using minimum stator current, as is common today, generally results in a minimization of the overall losses. However, due to the loss distribution in the electric machine and the different cooling connections of the rotor and stator, disadvantageous temperature distributions may occur in the machine.

This results in the rotor and stator warming and cooling at different rates during the operation of the machine, depending on the load. As a result, for example, during driving operation in the case of an electric vehicle or a hybrid vehicle, the available maximum power is limited by the first component which reaches the permissible maximum temperature. Whereas in the base speed region, the stator generally reaches its limit temperature first, in the field weakening region, the rotor temperature usually reaches the maximum limit first.

Because of the poorer cooling connection of the rotor, the increased rotor temperature results in a longer cooling phase, in which the available machine power must be reduced, and correspondingly less drive power is available, for example, in the hybrid or electric vehicle. In addition, in the hybrid vehicle, a modified torque distribution results between the internal combustion engine and the electric machine, which may result in less advantageous overall losses and thus ultimately in lower cycle efficiency.

The idea underlying the present invention is to take this knowledge into account and to provide an option to shift the losses within the electric machine via a modified strategy for specifying the operating point-dependent current pointer between the rotor and stator in such a way that the thermal load of the rotor and the stator of the electric machine may be adjusted depending on the application and, for example, the electric drive of a hybrid vehicle may be used in an optimal manner, viewed over the entire driving cycle.

For this purpose, the present invention provides that in the control device, a computing device sets an operating point for the electric machine. In this case, the computing device sets the operating point based on a torque specification and the temperatures of the rotor and the stator of the electric machine. Furthermore, a distribution for the thermal load of the stator and the rotor is specified.

The temperature of the rotor and the temperature of the stator are not to be understood to mean only the absolute temperatures. Rather, a calculation which is based on the aforementioned temperatures may also be based on a temperature change over time or a temperature gradient or the like.

The distribution of the thermal load may qualitatively determine that in a certain operating mode of the electric machine, for example, the rotor is to be thermally less loaded than the stator. However, the predefined distribution may also include quantitative determinations which, for example, specify a percentage distribution of the thermal load between the stator and the rotor of the electric machine.

If the temperatures of the stator and the rotor are also taken into account during the calculation of the operating point of the electric machine, the currents in the electric machine may be supplied in such a way that either the stator or the rotor warms more. Thus, the thermal load of the rotor and the stator may be adjusted to different load cases or use cases. This will be described in greater detail in connection with the figures.

By means of the above-described features of the present invention, the time until reaching the permissible maximum temperature of the electric machine is extended, or the cooling phase of the electric machine is shortened.

Furthermore, the average electric power available in the driving cycle and thus the performance of the electric drive increases, for example, in hybrid vehicles.

Finally, for example, in hybrid vehicles, the greater availability of the electric drive results in an increased optimization potential of the torque distribution between the internal combustion engine and the electric machine, and thus in a minimization of the cycle-specific overall energy requirement of the hybrid vehicle.

Advantageous specific embodiments and refinements result from the subclaims and from the description with reference to the figures.

In one specific embodiment, the computing device is designed to set the operating point by calculating a d-axis component of a current vector and a q-axis component of the current vector in a field-oriented coordinate system. This simplifies the calculation of the motor setpoint currents.

In one specific embodiment, the control device includes a memory which is designed to store a machine-specific characteristic curve field for the electric machine, which specifies the resulting torque and in particular the resulting motor current and/or the resulting magnetic flux in the electric machine for predefined values of the d-axis component and the q-axis component of the current vector. This enables a selection of suitable d-axis components and the q-axis components of the current vector for different application cases.

In one specific embodiment, the computing device is designed, in particular based on the characteristic curve field, to increase and/or to decrease the d-axis component of the current vector with respect to the q-axis component of the current vector, and to adjust the q-axis component of the current vector in such a way that the torque predefined by the torque specification is reached in the electric machine if the thermal load of the rotor is to be decreased with respect to the thermal load of the stator.

In one specific embodiment, the electric machine is designed as a permanently excited synchronous machine, and the computing device is designed to increase the d-axis component of the current vector, in particular based on the characteristic curve field, with respect to the q-axis component of the current vector in the characteristic curve field, and/or to decrease the q-axis component of the current vector with respect to the d-axis component of the current vector, if the thermal load of the rotor is to be decreased with respect to the thermal load of the stator. Shifting the operating point toward a d-axis component of the stator current having a greater magnitude results in a reduction of the effective overall field in the rotor and thus in a reduction of the rotor losses, and ultimately in reduced heat introduction in the rotor.

In one specific embodiment, the computing device is designed to increase the d-axis component of the current vector, in particular based on the characteristic curve field, and to decrease the q-axis component of the current vector, so that the resulting current vector is shifted to a characteristic curve having a constant torque. This enables a reduction of the heat introduction into the rotor at a constant torque.

In one specific embodiment, the computing device is designed to decrease the magnitude of the current vector if the thermal load of the stator is to be decreased. This enables cooling of the stator and the rotor.

In one specific embodiment, the computing device is designed to calculate the operating point furthermore based on an intermediate circuit voltage of the control device and/or a stator frequency. This enables a simple calculation of the operating point.

In one specific embodiment, the temperature detection device is designed to calculate the temperature of the stator and/or the temperature of the rotor, in particular in a model-based manner. This enables a simplified structure of the control device.

In one specific embodiment, the temperature detection device includes at least one temperature sensor for detecting the temperature of the stator and/or the temperature of the rotor. This enables an exact detection of the relevant temperatures.

In one specific embodiment, the control device includes a current controller which is coupled to the computing device and is designed to calculate control voltages for the phases of the electric machine based on the operating point set by the computing device. This enables a simple control of the electric machine based on the set operating point.

In one specific embodiment, the electric machine is coupled to a drive train of the vehicle and is designed to drive the vehicle. This enables operating the vehicle as a pure electric vehicle.

In one specific embodiment, the vehicle includes an internal combustion engine which is mechanically coupled to the drive train and is designed to drive the vehicle alone or in connection with the electric machine. As a result, the present invention may be used, for example, in hybrid vehicles.

The embodiments and refinements mentioned above may be combined in any arbitrary manner if expedient. Further possible embodiments, refinements, and implementations of the present invention also include combinations not explicitly mentioned of features of the present invention previously described or described below with respect to the exemplary embodiments. In particular, those skilled in the art will also add individual aspects as improvements or refinements to the respective basic form of the present invention.

BRIEF DESCRIPTION OF THE DRAWINGS

The present invention is described in greater detail below based on the exemplary embodiments specified in the schematic figures of the drawings. The following are shown.

In all figures, identical or functionally identical elements and devices have been provided with the same reference numerals, unless stated otherwise.

DETAILED DESCRIPTION

Figure 1:
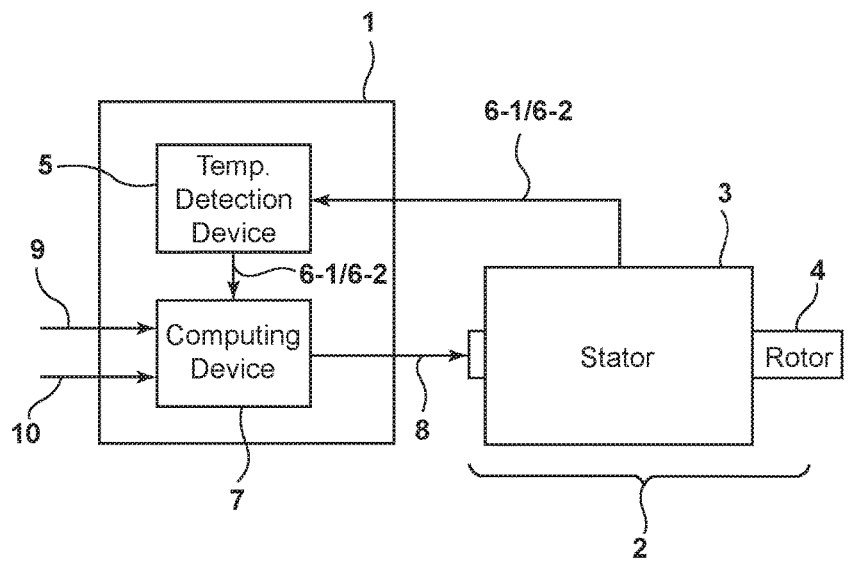
FIG. 1 shows a block diagram of one specific embodiment of a control device according to the present invention.

FIG. 1 shows a block diagram of one specific embodiment of a control device 1 according to the present invention. Furthermore, FIG. 1 depicts an electric machine 2 which includes a stator 3 and a rotor 4.

The control device 1 of FIG. 1 includes a temperature detection device 5 which is coupled to the electric machine 2 in order to detect the temperature 6-1 of the stator 3 and the temperature 6-2 of the rotor 4 and to route them to a computing device 7.

The computing device 7 calculates an operating point 8 for the electric machine 2, which is used for controlling the electric machine 2. The computing device 7 calculates the operating point 8 based on the temperature 6-1 of the stator 3 and the temperature 6-2 of the rotor 4, and based on a torque specification 9 and a predefined distribution 10 for the thermal load of the stator 3 and the rotor 4.

The predefined distribution 10 for the thermal load of the stator 3 and the rotor 4 may qualitatively specify that, for example, the stator 3 is to be more strongly thermally loaded than the rotor 4, or vice versa. Alternatively, the predefined distribution 10 for the thermal load of the stator 3 and the rotor 4 may also quantitatively specify a specific distribution ratio or a range for a distribution ratio.

The computing device 7 may calculate the operating point 8, for example, in that it calculates a d-axis component 11 of a current vector 13-1 to 13-3 and a q-axis component 12 of the current vector 13-1 to 13-3 in a field-oriented coordinate system. The field-oriented coordinate system is fixed with respect to the rotor 4 and thus rotates with it.

The present invention makes use of the fact that a shifting of the operating point 8 toward a d-axis component 11 of the stator current having a greater magnitude results in a reduction of the effective overall field in the rotor 4 and thus in a reduction of the rotor loss. This results in the magnitude of the overall current increasing and the losses in the stator 3 likewise increasing. However, due to the normally better cooling connection of the stator 3, the warming of the stator 3 may be controlled better than the warming of the rotor 4. These relationships are explained in greater detail in connection with FIG. 4.

FIG. 1 does not depict those components of an electric machine control device which do not require explanation and which may be assumed to be obvious. Thus, for example, FIG. 1 does not show the current controller and the inverter which generate the control voltages for the electric machine based on the specification of the computing device 7.

Figure 2:
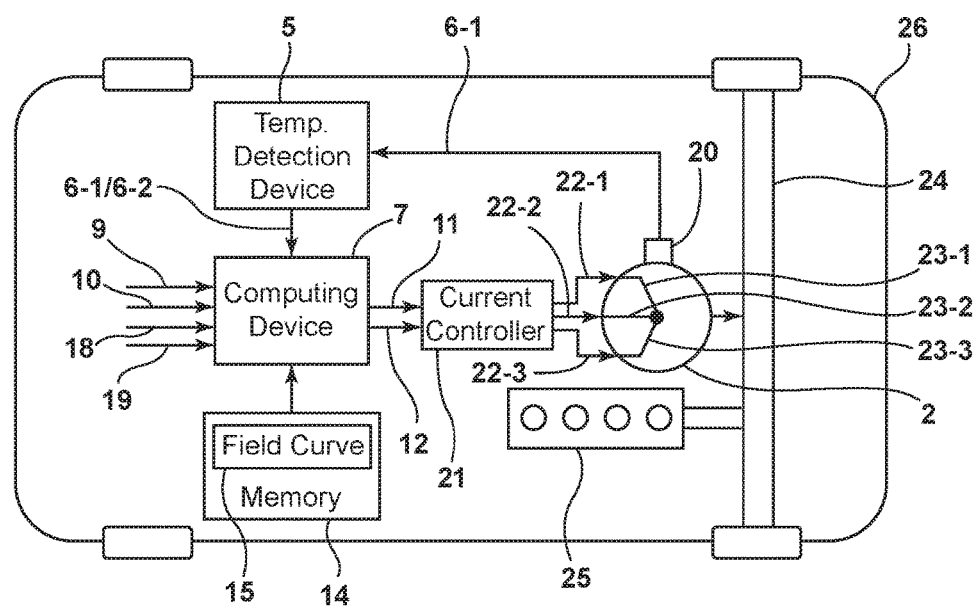
FIG. 2 shows a block diagram of one specific embodiment of a vehicle according to the present invention.

FIG. 2 shows a block diagram of one specific embodiment of a vehicle 26 according to the present invention including an electric machine 2, an internal combustion engine 25, and including a control device 1 according to the present invention. The control device 1 is not depicted separately; rather, the components of the control device 1 are depicted.

The electric machine 2 and the internal combustion engine 25 are each coupled to a drive train 24 of the vehicle 26, via which the vehicle 26 is driven.

The control device 1 of FIG. 2 differs from the control device 1 of FIG. 1 in such a way that a temperature sensor 20 is provided, which is attached to the stator 3 of the electric machine 2 and provides the temperature of the stator 6-1 to the temperature detection device 5. The temperature detection device 5 is designed to calculate the temperature 6-2 of the rotor 4 in a model-based manner from the temperature 6-1 of the stator 3, and to provide the two temperatures 6-1, 6-2 to the computing device 7. Alternatively, a second temperature sensor may be provided, which detects the temperature 6-2 of the rotor 4 and provides it to the temperature detection device 5.

Furthermore, a memory 14 is provided, in which a characteristic curve field 15, in particular a machine-specific characteristic curve field 15, is stored for the electric machine 2 and is provided to the computing device 7. The characteristic curve field 15 is described in greater detail in FIG. 4.

The characteristic curve field 15 specifies the resulting torque 17 for predefined values of the d-axis component 11 and the q-axis component 12 of the current vector 13-1 to 13-3. In one specific embodiment, the characteristic curve field 15 may also specify the resulting motor current 16 and/or the resulting magnetic flux 30 in the electric machine 2. Thus, for example, for a predefined torque 17, the corresponding current vector 13-1 to 13-3 may be derived from the characteristic curve field. The d-axis component 11 and the q-axis component 12 of the current vector 13-1 to 13-3 may be selected in such a way that a distribution of the d-axis component 11 and the q-axis component 12 results which corresponds to the predefined distribution 10 for the thermal load of the stator 3 and the rotor 4.

In particular, for example, a d-axis component 11 of the current vector 13-1 to 13-3 may be determined, which is increased with respect to the q-axis component 12 of the current vector 13-1 to 13-3, in order to decrease the thermal load of the rotor 4 with respect to the thermal load of the stator 3. If the thermal load of the stator 3 is also to be decreased, the magnitude of the current vector 13-1 to 13-3 may be decreased.

Generally, the computing device 7 may be designed, based on the characteristic curve field 15, to change the d-axis component 11 of the current vector 13-1 to 13-3 with respect to the q-axis component 12 of the current vector 13-1 to 13-3, and to adjust the q-axis component 12 correspondingly, so that the torque predefined by the torque specification 9 is reached in the electric machine 2. The computing device 7 may, for example, increase the d-axis component 11 and decrease the q-axis component 12, or vice versa. The specific adjustment is a function of the characteristic curve field 15 of the particular electric machine 2.

In FIG. 2, the computing device 7 is designed to calculate the operating point 8, i.e., the d-axis component 11 and the q-axis component 12 of the current vector 13-1 to 13-3, based on the temperature of the stator 6-1 and the temperature 6-2 of the rotor 4, as well as the torque specification 9, the predefined distribution 10 for the thermal load of the stator 3 and the rotor 4, an intermediate circuit voltage 18 of an intermediate circuit of the control device 1 (not depicted), and a stator frequency 19 which specifies the frequency of the control voltage of the stator 3.

The d-axis component 11 and the q-axis component 12 calculated by the computing device 7 are conveyed to a current controller 21, which generates control voltages 22-1 to 22-3 for the phases 23-1 to 23-3 of the stator 3 in such a way that the desired currents are reached in the q-axis and the d-axis.

Figure 3:
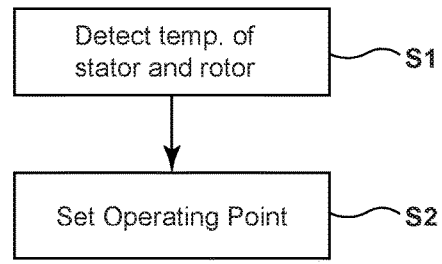
FIG. 3 shows a flow chart of one specific embodiment of a method according to the present invention.

FIG. 3 shows a flow chart of one specific embodiment of a method according to the present invention for controlling an electric machine 2 including a stator 3 and a rotor 4.

The method provides for the detection S1 of the temperature 6-1 of the stator 3 and the temperature 6-2 of the rotor 4 of the electric machine 2. An operating point 8 of the electric machine 2 is set, based on the detected temperature 6-1 of the stator 3 and the detected temperature 6-2 of the rotor 4, as well as a torque specification 9 and a predefined distribution 10 for the thermal load of the stator 3 and the rotor 4.

In one specific embodiment, the setting of the operating point 8 takes place by calculating a d-axis component 11 of a current vector 13-1 to 13-3 and a q-axis component 12 of the current vector 13-1 to 13-3 in a field-oriented coordinate system. In particular, in one specific embodiment, for example, the d-axis component 11 of the current vector 13-1 to 13-3 and the q-axis component 12 of the current vector 13-1 to 13-3 may be shifted relative to one another or adjusted in terms of magnitude, so that the predefined distribution 10 for the thermal load of the stator 3 and the rotor 4 results.

For this purpose, a characteristic curve field 15 may be provided which specifies the resulting torque 17 for predefined values of the d-axis component 11 and the q-axis component 12 of the current vector 13-1 to 13-3. In one embodiment, the characteristic curve field 15 may also specify the resulting motor current 16 and/or the resulting magnetic flux 30 in the electric machine 2.

For example, the d-axis component 11 may be increased with respect to the q-axis component 12 if the thermal load of the rotor 4 is to be decreased with respect to the thermal load of the stator 3. Alternatively, the q-axis component 12 of the current vector 13-1 to 13-3 may also be decreased with respect to the d-axis component 11 of the current vector 13-1 to 13-3 in the characteristic curve field 15.

In one specific embodiment, the d-axis component 11 and the q-axis component 12 may be adjusted in such a way that the resulting current vector 13-1 to 13-3 in the characteristic curve field 15 is shifted to a characteristic curve having a constant torque 17.

In one specific embodiment, when setting, the magnitude of the current vector 13-1 to 13-3 in the characteristic curve field 15 may be decreased if the thermal load of the stator 3 is to be decreased.

Figure 4:
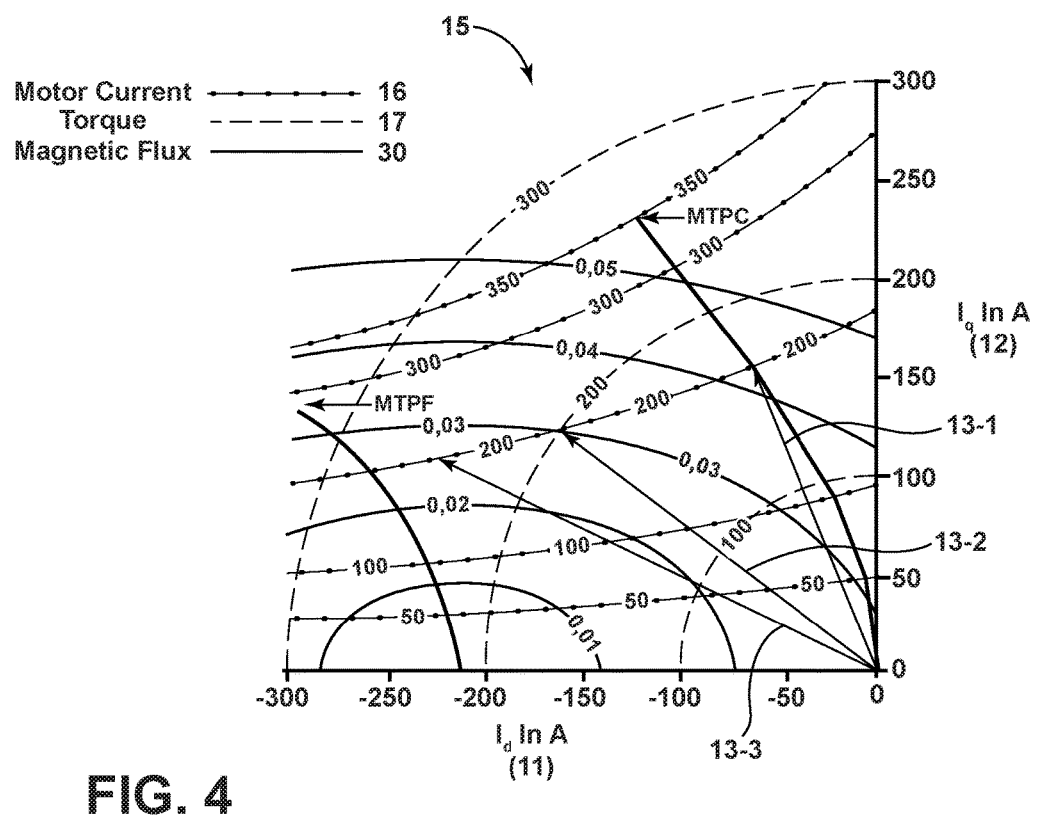
FIG. 4 shows a diagram of the d-axis component and the q-axis component for illustrating the present invention.

FIG. 4 shows a diagram of the d-axis component 11 and the q-axis component 12 for illustrating the present invention.

The abscissa axis of the diagram shows the d-axis component 11 of the stator current for currents from 0 A to −300 A. The ordinate axis of the diagram shows the q-axis component 12 of the stator current for currents from 0 A to 300 A. In the diagram, the lines of equal motor current 16 are plotted in an arc shape starting at the origin of the diagram. Furthermore, lines having an equal torque 17 are plotted in the diagram, which run starting at a −300 A d-axis component 11, slightly increasing up to a 0 A d-axis component 11. Finally, in the diagram, ellipse-shaped lines are depicted for the magnetic flux 30, which have their origin on the abscissa axis at approximately −220 A.

In FIG. 4, three current vectors 13-1 to 13-3 are plotted, the ends of which are each on the line for a torque of 200 Nm. The first current vector 13-1 has a d-axis component 11 of approximately −50 A and a q-axis component 12 of approximately 150 A. The second current vector 13-2 has a d-axis component 11 of approximately −150 A and a q-axis component 12 of approximately 125 A. The third current vector 13-3 has a d-axis component 11 of approximately −220 A and a q-axis component 12 of approximately 110 A.

The three current vectors 13-1 to 13-3 illustrate how a shift of the d-axis component 11 and the q-axis component 12 may be carried out at a constant torque 17. Thus, it is possible for a particular torque specification 9 to provide different current vectors 13-1 to 13-3 and thus to influence the distribution of the loss power between the stator 3 and the rotor 4.

For the predefined torque of 200 Nm, the current vector 13-1 constitutes the minimum-current operating point 8 for the base speed region. The current vector 13-2 constitutes the minimum-current operating point 8 for the field weakening mode. The current vector 13-3 constitutes an operating point 8 in which the d-axis component 11 was increased and the q-axis component 12 was decreased, so that the loss power is increased in the stator 3 and decreased in the rotor 4.

At the operating point 8 which corresponds to the third current vector 13-3, the total magnitude, i.e., the length, of the current vector 13-3 is greater than that of the other current vectors 13-1 and 13-2.

However, in electric machines, the rotor 4 is normally the limiting component, since it is the first to reach the maximum permissible temperature. As a result, the availability of the electric machine 2 may be increased if the heat introduction into the rotor 4 is decreased, even if the heat introduction into the stator is thereby increased.

It shall be understood that the diagram of FIG. 4 serves only as an example for explaining the present invention. In other specific embodiments, as already depicted above, based on the characteristic curve field 15, the d-axis component 11 of the current vector 13-1 to 13-3 may be changed with respect to the q-axis component 12 of the current vector 13-1 to 13-3, and the q-axis component 12 may be correspondingly adjusted. For example, the d-axis component 11 may be increased and the q-axis component 12 may be decreased, or vice versa. The specific adjustment is a function of the particular electric machine 2 and the corresponding characteristic curve field 15.

Although the present invention has been described above based on preferred exemplary embodiments, it is not limited thereto, but rather may be modified in a variety of ways. In particular, the present invention may be changed or modified in manifold ways without departing from the core of the present invention.

For example, in each exemplary embodiment which has been depicted within the scope of this patent application, the characteristic curve field 15 may be replaced by corresponding calculations.

Thus, instead of the memory 14, the formulas corresponding to the particular electric machine 2 may be stored in computing device 7, which enable a calculation of the respective operating point 8.

The invention claimed is:

1. A control device (1) for an electric machine (2) including a stator (3) and a rotor (4), the control device comprising:
a temperature detection device (5) which is configured to detect a temperature (6-1) of the stator (3) and a temperature (6-2) of the rotor (4);
a computing device (7) which is configured to set an operating point (8) of the electric machine (2) based on a torque specification (9), the detected temperature (6-1) of the stator (3), the detected temperature (6-2) of the rotor (4) and a predefined distribution (10) for a thermal load of the stator (3) and the rotor (4) by calculating a d-axis component (11) of a current vector (13-1 to 13-3) and a q-axis component (12) of the current vector (13-1 to 13-3) in a field-oriented coordinate system;
a memory (14) configured to store a machine-specific characteristic curve field (15) for the electric machine (2), which specifies a resulting motor current (16) and a resulting torque (17) and a resulting magnetic flux (30) in the electric machine (2) for predefined values of the d-axis component (11) and the q-axis component (12) of the current vector (13-1 to 13-3); and a current controller (21) which is coupled to the computing device (7) and is configured to calculate control voltages (22-1 to 22-3) for the phases (23-1 to 23-3) of the electric machine (2) based on the operating point (8) set by the computing device (7), wherein the computing device (7) is configured to adjust the d-axis component (11) of the current vector (13-1 to 13-3) with respect to the q-axis component (12) of the current vector (13-1 to 13-3), and to adjust the q-axis component (12) of the current vector (13-1 to 13-3) in such a way that the torque predefined by the torque specification (9) is reached in the electric machine (2) if the thermal load of the rotor (4) is to be decreased with respect to the thermal load of the stator (3), and wherein the computing device (7) is configured to increase the d-axis component (11) of the current vector (13-1 to 13-3) with respect to the q-axis component (12) of the current vector (13-1 to 13-3), to decrease the q-axis component (12) of the current vector (13-1 to 13-3) with respect to the d-axis component (11) of the current vector (13-1 to 13-3), or both when the thermal load of the rotor (4) is decreased with respect to the thermal load of the stator (3).

2. The control device as claimed in claim 1,
wherein the computing device (7) is configured to increase the d-axis component (11) of the current vector (13-1 to 13-3) and to decreased the q-axis component (12) of the current vector (13-1 to 13-3), so that the resulting current vector (13-1 to 13-3) is shifted to a characteristic curve having a constant torque (17).

3. The control device as claimed in claim 1,
wherein the computing device (7) is configured to decrease the magnitude of the current vector (13-1 to 13-3) if the thermal load of the stator (3) is to be decreased.

4. The control device as claimed in claim 1,
wherein the computing device (7) is configured to calculate the operating point (8) based on a stator frequency (19), which specifies the frequency of the control voltage of the stator.

5. The control device as claimed in claim 1,
wherein the temperature detection device (5) is configured to calculate the temperature (6-1) of the stator (3), the temperature (6-2) of the rotor (4), or both; and
wherein the temperature detection device (5) includes at least one temperature sensor (20) for detecting the temperature (6-1) of the stator (3), the temperature (6-2) of the rotor (4), or both.

6. A vehicle (26) comprising:
an electric machine (2) which includes a stator (3) and a rotor (4);
a drive train (24) of the vehicle (26) that is coupled with the electric machine for driving the vehicle; and
a control device (1) which is coupled to the electric machine (2) and is configured to control the electric machine (2), the control device including
a temperature detection device (5) which is configured to detect a temperature (6-1) of the stator (3) and a temperature (6-2) of the rotor (4); and
a computing device (7) which is configured to set an operating point (8) of the electric machine (2) based on a torque specification (9), the detected temperature (6-1) of the stator (3), the detected temperature (6-2) of the rotor (4), a predefined distribution (10) for a thermal load of the stator (3) and the rotor (4), and a stator frequency (19), wherein the computing device (7) is configured to adjust a d-axis component (11) of a current vector (13-1 to 13-3) with respect to a q-axis component (12) of the current vector (13-1 to 13-3), and to adjust the q-axis component (12) of the current vector (13-1 to 13-3) in such a way that the torque predefined by the torque specification (9) is reached in the electric machine (2) if the thermal load of the rotor (4) is to be decreased with respect to the thermal load of the stator (3), and wherein the computing device (7) is configured to increase the d-axis component (11) of the current vector (13-1 to 13-3) with respect to the q-axis component (12) of the current vector (13-1 to 13-3), to decrease the q-axis component (12) of the current vector (13-1 to 13-3) with respect to the d-axis component (11) of the current vector (13-1 to 13-3), or both when the thermal load of the rotor (4) is decreased with respect to the thermal load of the stator (3).

7. The vehicle as claimed in claim 6,
wherein the computing device (7) is configured to calculate the operating point (8) based on the stator frequency (19) that specifies the frequency of the control voltage of the stator.

8. The vehicle as claimed in claim 6,
including an internal combustion engine (25) which is mechanically coupled to the drive train (24) and is configured to drive the vehicle (26) alone or in connection with the electric machine (2).

9. A method for controlling an electric machine (2) including a stator (3) and a rotor (4), including:
detecting (S1) a temperature (6-1) of the stator (3) and a temperature (6-2) of the rotor (4);
setting (S2) an operating point (8) of the electric machine (2) with a computing device based on a torque specification (9), the detected temperature (6-1) of the stator (3), the detected temperature (6-2) of the rotor (4), and a predefined distribution (10) for a thermal load of the stator (3) and the rotor (4) by calculating a d-axis component (11) of a current vector (13-1 to 13-3) and a q-axis component (12) of the current vector (13-1 to 13-3) in a field-oriented coordinate system; and
calculating control voltages (22-1 to 22-3) for phases (23-1 to 23-3) of the electric machine (2) based on the operating point (8),
wherein when setting, the d-axis component (11) of the current vector (13-1 to 13-3) is increased with respect to the q-axis component (12) of the current vector (13-1 to 13-3), and wherein the q-axis component (12) of the current vector (13-1 to 13-3) is decreased with respect to the d-axis component (11) of the current vector (13-1 to 13-3), if the thermal load of the rotor (4) is to be decreased with respect to the thermal load of the stator (3); and
wherein when setting, the magnitude of the current vector (13-1 to 13-3) is decreased if the thermal load of the stator (3) is to be decreased.

10. The method as claimed in claim 9, wherein the setting of the operating point is based further on a stator frequency (19) that specifies the frequency of the control voltage of the stator.

* * * * *